US012247441B2

(12) United States Patent
Jamar

(10) Patent No.: US 12,247,441 B2
(45) Date of Patent: Mar. 11, 2025

(54) OVER-THE-COUNTER SEAT

(71) Applicant: John Jamar, Webster, TX (US)

(72) Inventor: John Jamar, Webster, TX (US)

( * ) Notice: Subject to any disclaimer, the term of this patent is extended or adjusted under 35 U.S.C. 154(b) by 974 days.

(21) Appl. No.: 17/318,251

(22) Filed: May 12, 2021

(65) Prior Publication Data

US 2022/0364415 A1 Nov. 17, 2022

(51) Int. Cl.
*E06C 7/48* (2006.01)
*E06C 1/00* (2006.01)
*E06C 1/393* (2006.01)

(52) U.S. Cl.
CPC .............. *E06C 1/005* (2013.01); *E06C 1/393* (2013.01); *E06C 7/48* (2013.01)

(58) Field of Classification Search
CPC . E06C 1/005; E06C 1/393; E06C 7/48; E06C 5/24; E06C 7/505; E06C 7/484; A47C 12/00; A47C 12/02
USPC .......................................................... 182/28
See application file for complete search history.

(56) References Cited

U.S. PATENT DOCUMENTS 2,109,886 A * 3/1938 Lewis ..................... E06C 1/393 182/124
3,494,446 A * 2/1970 Jacobson .................. E06C 1/14 182/28
4,765,439 A * 8/1988 Kresmery ................. E06C 7/48 182/206
6,206,139 B1 * 3/2001 Bogart, Jr. ................ E06C 1/39 182/96
6,837,338 B2 * 1/2005 Grover ...................... E06C 7/48 182/214
8,925,685 B2 * 1/2015 Dufour ..................... E06C 7/14 248/210
10,767,417 B2 * 9/2020 Andrade .................. A47B 5/04
10,995,548 B2 * 5/2021 Cornthwaite ............. E06C 1/16
11,982,127 B2 * 5/2024 Lajoie ..................... E06C 7/188
2006/0192063 A1 * 8/2006 Angotti ..................... E06C 7/14 248/210
2009/0173575 A1 * 7/2009 Jones ........................ E06C 7/48 182/107
2015/0001005 A1 * 1/2015 Goodson ................ A47B 77/00 182/96
2017/0130530 A1 * 5/2017 Lawler ...................... E06C 7/14
2020/0399099 A1 * 12/2020 Tanimoto ................ B66C 23/74

* cited by examiner

*Primary Examiner* — Daniel J Troy
*Assistant Examiner* — Susan M. Heschel
(74) *Attorney, Agent, or Firm* — Jeffrey L. Streets

(57) ABSTRACT

An apparatus includes front and back legs and a top cap that is pivotally coupled to the front legs along a first lateral axis and pivotally coupled to the back legs along a second lateral axis. The top cap has a front edge, a back edge, and a top surface available for use as a seat. The first lateral axis is closer to the front edge than the second lateral axis, and the first lateral axis is spaced further from the front edge than the second lateral axis is spaced from the back edge. The apparatus further includes a stabilizer secured to the top cap between the front edge and the first lateral axis, wherein the stabilizer extends in a downward direction from the top cap for engaging a countertop and/or a recess in the countertop, such as a sink. The stabilizer optionally includes a clamp for gripping the countertop.

20 Claims, 7 Drawing Sheets

OVER-THE-COUNTER SEAT

BACKGROUND

The present disclosure relates to folding chairs, stools and ladders.

BACKGROUND OF THE RELATED ART

A wide variety of grooming tasks involve the use of a mirror. A mirror enables a person to see themselves in a manner that they could not overwise see. Specifically, a mirror is essential for an individual to see their own face so that they may accurately comb or style their hair, apply skin care creams or makeup, remove facial hair, and similar tasks.

To facilitate the use of a mirror for these types of tasks, the individual may obtain a vanity desk or table having a small top surface for laying out various grooming items or products, a mirror mounted to the back of the top surface, and a short bench or stool for sitting up close the mirror. Some vanity desks will even have their own lights adjacent to the mirror so that the lighting is optimal for the individual to perform a grooming task in fine detail. However, a vanity desk or table can be expensive and requires the dedication of some available floor space in a bedroom or bathroom.

It is common for a modern bathroom to have a mirror mounted to the wall behind a sink. The proximity of the mirror to the sink can be helpful for certain grooming task, such as shaving, but the distance from the front of the sink to the mirror makes it difficult to get close to the mirror for a detailed grooming task.

A countertop makeup mirror is an option that provides some of the benefits of a vanity desk without the expense and required floor space. A countertop makeup mirror may be set on a bathroom counter and moved as close to the individual as desired. However, makeup mirrors generally have only a small mirror for very fine detailed tasks.

BRIEF SUMMARY

Some embodiments provide an apparatus comprising a set of front legs, a set of back legs and a top cap that is pivotally coupled to the set of front legs along a first lateral axis and pivotally coupled to the set of back legs along a second lateral axis. The set of front legs includes a first front leg, a second front leg and at least one brace connected between the first and second front legs. The set of back legs includes a first back leg, a second back leg and at least one brace connected between the first and second back legs. The top cap has a front edge, a back edge, two side edges extending from the front edge to the back edge, and a top surface available for use as a seat. The first lateral axis is closer to the front edge than the second lateral axis, and the first lateral axis is spaced further from the front edge than the second lateral axis is spaced from the back edge. The apparatus further comprises a stabilizer secured to the top cap between the front edge and the first lateral axis, wherein the stabilizer extends in a downward direction from the top cap for engaging a countertop.

Some embodiments provide an apparatus comprising a set of front legs, a set of back legs, and a top cap that is pivotally coupled to the set of front legs along a first lateral axis and pivotally coupled to the set of back legs along a second lateral axis. The set of front legs includes a first front leg, a second front leg and at least one brace connected between the first and second front legs. The set of back legs includes a first back leg, a second back leg and at least one brace connected between the first and second back legs. The top cap has a front edge, a back edge, two side edges extending from the front edge to the back edge, and a top surface available for use as a seat. The first lateral axis is closer to the front edge than the second lateral axis, and the first lateral axis is spaced further from the front edge than the second lateral axis is spaced from the back edge. The apparatus further comprises a first stabilizer adjustably secured to the top cap between the front edge and the first lateral axis, wherein the first stabilizer is extendable in a downward direction from the top cap for engaging a recess within a countertop, and a second stabilizer adjustably secured to the top cap between the front edge and the first lateral axis, wherein the second stabilizer is extendable in a downward direction from the top cap for engaging the recess within the countertop.

DETAILED DESCRIPTION

Figure 1:
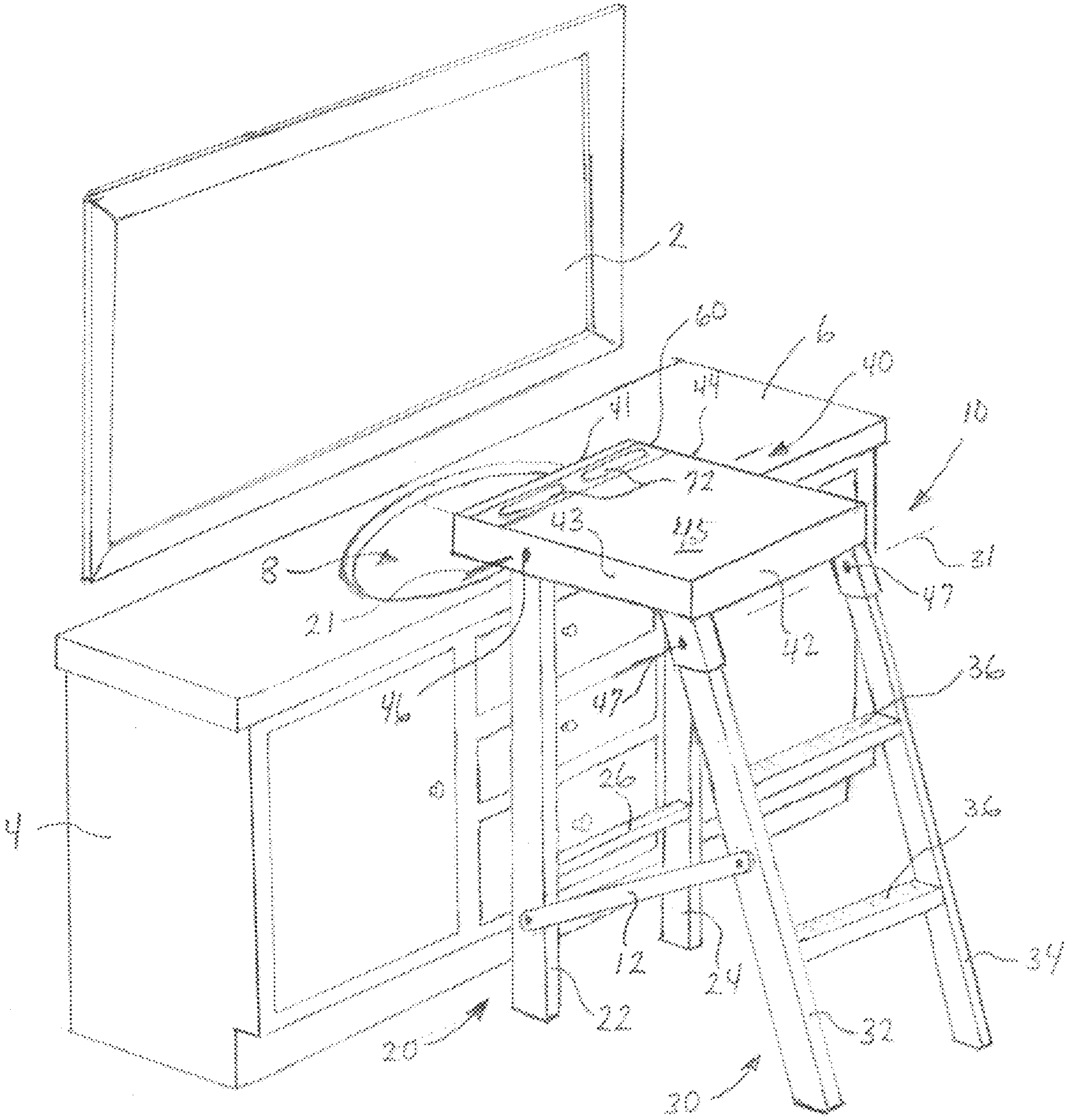
FIG. 1 is a perspective view of an over-the-counter seat (the "apparatus") in position in front of a sink and mirror.

Some embodiments provide an apparatus comprising a set of front legs, a set of back legs and a top cap that is pivotally coupled to the set of front legs along a first lateral axis and pivotally coupled to the set of back legs along a second lateral axis. The set of front legs includes a first front leg, a second front leg and at least one front brace connected between the first and second front legs. The set of back legs includes a first back leg, a second back leg and at least one back brace connected between the first and second back legs. The top cap has a front edge, a back edge, two side edges extending from the front edge to the back edge, and a top surface available for use as a seat. The first lateral axis is closer to the front edge than the second lateral axis, and the first lateral axis is spaced further from the front edge than the second lateral axis is spaced from the back edge. The apparatus further comprises a stabilizer secured to the top cap between the front edge and the first lateral axis, wherein the stabilizer extends in a downward direction from the top cap for engaging a countertop.

The apparatus may be referred to as an over-the-counter seat, stool or ladder. The apparatus may be stored in a folded configuration and used in an operative (unfolded) configuration in which the legs are supported by a floor and the top cap rests on the legs with a top surface of the top cap available to be used as a seat for an individual person. In the operative configuration, the apparatus provides a stable seat that at least partially extends over a portion of a countertop. For example, the apparatus may be positioned with the front legs adjacent or flush with an outer edge of a cabinet with a countertop, and the legs may be long enough to position the top cap a short distance above the height of the countertop. Where the countertop has a recess forming a sink, such as a bathroom sink, kitchen sink or mudroom sink, the top cap may extend over a portion of the countertop to a position adjacent or overlapping a portion of the sink. In fact, the apparatus may be used in conjunction with a pedestal sink where the edge of the sink, however wide or narrow, may be considered to be a countertop for purposes of this description. It is a benefit of the apparatus that the top surface of the top cap is available for use as a seat for a person to sit on the top cap or seat with their feet in the sink. This position facilitates various grooming tasks that may involve the sink and/or a mirror mounted on a wall in front of the sink. The dimensions of the top cap may provide sufficient width (side-to-side) and depth (front-to-back) that the person may safely and securely sit on the top cap facing the sink and mirror.

The top cap forms a generally horizontal platform or seat suitable for sitting. In one option, the top cap may have a top surface which forms a seat that may be contoured and/or padded to provide increased comfort to a person sitting on the seat. The top cap is also pivotally coupled to the set of front legs along the first lateral axis and pivotally coupled to the set of back legs along the second lateral axis. The pivotal coupling may be a hinge plate or other arrangement using a hinge pin. For example, a hinge pin may have two opposing ends, where each end has a head that prevents the pin from disengaging from a pair of opposing brackets or arms formed by, or secured to, the top cap. The hinge pin may also extend through a hole in an upper end of a leg, which hole may include a bushing. Optionally, the top cap may form or secure a separate hinge, such as a separate bracket and hinge pin, for each of the legs. The top cap may also support a stabilizer or an adjustment mechanism for a stabilizer, such as a guide track.

The top cap has a front edge, a back edge, two side edges extending from the front edge to the back edge, and a top surface available for use as a seat. The edge may be straight or curved, such that the top cap may have top surface that is rectangular, polygonal, circular, elliptical, or other shape. A top cap having any of these shapes may be described as having a front edge (i.e., an edge at the front), a back edge (i.e., an edge at the back), and two side edges (i.e., the edges at each side). The front, back and two side edges collectively form a perimeter of the top cap.

The set of front legs includes a first front leg, a second front leg and at least one front brace connected between the first and second front legs. The at least one front brace maintains the first and second front legs at a fixed spacing, such that the first and second front legs do not bend inward toward each other or outward away from each other. The at least one front brace may be a single horizontal brace, a pair of angled braces (i.e., forming an "X" pattern), or other brace arrangement. Similarly, the set of back legs includes a first back leg, a second back leg and at least one back brace connected between the first and second back legs. The at least one back brace maintains the first and second back legs at a fixed spacing, such that the first and second back legs do not bend inward toward each other or outward away from each other. The at least one back brace may be a single horizontal brace, a pair of angled braces (i.e., forming an "X" pattern), or other brace arrangement. Still further, the at least one back brace may be, or include, at least one step, where each step forms a surface for a person to step on while climbing onto the apparatus and has two lateral ends that are coupled to the first and second back legs, respectively. Optionally, each step may have a step surface that is horizontal with the apparatus in its operative configuration. It should also be appreciated that the at least one front brace may cause the set of front legs to pivot together about the first lateral axis and the at least one back brace may cause the set of back legs to pivot together about the second lateral axis.

In some embodiments, the apparatus may include a spreader having a first end pivotably coupled to the first front leg and a second end pivotably coupled to the first back leg. The spreader may be a single rigid bar, a folding pair of rigid bars, or a flexible component so long as it has a fixed maximum length to limit the distance between the set of front legs and the set of back legs when the apparatus is in the operative configuration. Alternative or additional spreaders may also be used, such as a folding spreader between one of the front legs and the top cap. These and other spreader arrangements may be implemented in one or more embodiments.

In some embodiments, each of the legs is an adjustable height leg. For example, each leg may include telescoping tubes or rails that can be locked in multiple increments of linear extension of the inner tube or rail relative to the out tube or rail. Optionally, one or more of the telescoping tubes or rails may have a series of holes that may receive a pin or spring-loaded button to prevent inner tube or rail from retracting into the outer tube or rail during use of the apparatus. Each adjustable height leg is preferably manually adjustable without the use of tools, but embodiments may also include set screws or cotter pins that may require use of a screwdriver or pliers to make height adjustments. It should be understood that the adjustable height leg may be adjusted at a lower end of the leg, at an upper end of the leg, or at some intermediate point along the height of the leg.

The height of each adjustable height leg is preferably adjustable over a range of heights that position the top cap a short distance above (higher) that a top surface of a countertop. In a first option, the range of heights may position the top cap a short distance, such as from 1 to 4 inches, above a standard counter height (i.e., about 36 inches above a floor) at the lower end of the range and may position the top cap a short distance, such as from 1 to 4 inches, above a standard bar-type counter height (i.e., about 42 inches above a floor) at the upper end of the range. In a second option, the range of heights may position the top cap a short distance, such as from 1 to 10 inches, above a standard counter height (i.e., about 36 inches above a floor) or standard bar-type counter height (i.e., about 42 inches above a floor) to accommodate additional leg room for an individual seated on the top cap with their feet in the sink or on the counter. Furthermore, the first and second options may be combined such that the adjustable height legs may be adjusted to account for both for a variation in the height of the counter and/or a variation in spacing above the counter that is desirable for a person sitting on the top cap.

Each leg preferably includes a foot that engages a floor. A preferred foot will have a lower surface that contacts a floor over a substantial surface area (i.e., not simply a single point of contact) to increase the grip with the floor. Furthermore, each foot may have a lower surface that is substantially horizontal when the apparatus is in an operative configuration so that each foot contacts the floor during use. Optionally, the lower surface of the foot may be made of, or coated with, a plastic or rubber material having a high coefficient of friction.

The stabilizer is secured to the top cap between the front edge and the first lateral axis. This is the portion of the top cap that extends forward of the set of front legs toward and/or over the top surface of the countertop. The stabilizer extends in a downward direction from the top cap for engaging the countertop. Accordingly, the stabilizer may extend between the top cap and the countertop to provide support to the portion of the top cap that extends forward of the set of front legs. Specifically, the stabilizer may prevent the front edge of the top cap from tipping downward toward the countertop in the event that a greater portion of a person's weight rests on the top cap forward of the first lateral axis than rests on the top cap behind the first lateral axis. In that event, a net force would be applied in a downward direction to the front of the first lateral axis where the front legs support the top cap, which net force is transmitted from the top cap through the stabilizer to the countertop. Accordingly, the stabilizer my prevent forward tipping of the apparatus that would otherwise be caused by forward leaning or shifting of the person while sitting on the top cap.

In some embodiments, the stabilizer may be adjustably extendable in the downward direction from the top cap. An adjustably extendable stabilizer may be adjusted to control the distance that the stabilizer extends below the top cap. The adjustably extendable stabilizer enables the stabilizer to engage the countertop and prevent tipping despite variations in the height of the countertop, variations in the length of the legs supporting the top cap, and/or variations in the levelness of the floor or countertop. In one option, the adjustably extendable stabilizer may include a threaded rod that engages a threaded member of the top cap, such that the distance that the adjustably extendable stabilizer extends below the top cap may be adjusted by turning the rod in a first rotational direction to extend the stabilizer downward toward the countertop and turning the rod in a second rotational direction to retract the stabilizer upward toward the top cap. In a further option, the adjustably extendable stabilizer may have a threaded rod with a terminal end forming a head with a slot or socket, such as a hexagonal socket (or other shape of socket), that is accessible from the top surface of the top cap. Accordingly, a tool, such as a key or screwdriver, with a complementary shape (i.e., a hexagonal key for a hexagonal socket) may be used to turn the rod and cause the adjustably extendable stabilizer to be extended or retracted.

In some embodiments, the stabilizer may be adjustably extendable in the downward direction from the top cap for extending into and/or engaging a recess within the countertop. Such an adjustably extendable stabilizer may be adjusted in the same manner as other adjustably extendable stabilizers described above, but may have a downward portion that extends into the recess within the countertop, such as a sink. An adjustably extendable stabilizer that extends into the recess may be used to either prevent forward tipping or prevent the apparatus from being accidentally being pushed or slid back and away from the countertop. One or more features of one embodiment of the stabilizer may be combined with any one or more features of another embodiment of the stabilizer. For example, an adjustably extendable stabilizer may be adjusted to engage a top surface of the countertop to prevent the apparatus from tipping forward while also being extended into the recess to prevent the apparatus from being pushed or slid back and away from the countertop.

In some embodiments, the stabilizer will have a rod with an upper portion that is threaded to engage a threaded portion of the top cap and a lower portion that is secured to a stabilizer pad for engaging the countertop and/or recess within the countertop. Optionally, the lower portion of the rod may have an enlarged lower end that can rotate freely within the stabilizer pad but is retained within the stabilizer pad. For example, the rod may define a central axis, the enlarged lower end may have a surface of rotation about the central axis, and the stabilizer pad may have a cavity with a shape that is complementary to the enlarged lower end. Furthermore, the cavity may have a slightly larger dimension to allow the enlarged lower end to rotation within the cavity without causing the stabilizer pad to also rotate. In other words, the stabilizer pad may engage and grip the countertop and/or the recess and remain in place while the rod may be further rotated, such as to press the stabilizer pad firmly against the countertop. In addition, the stabilizer pad may extend over the countertop and into the recess where the stabilizer pad is prevented from rotating to any appreciable degree by the dimensions of the recess, yet the rod may be further rotated to extend the stabilizer pad further toward the countertop and/or further into the recess.

In some embodiments, the stabilizer pad may form a clamp having a first jaw that is received inside the recess and a second jaw that is received along an outward edge of the countertop. In one option, the clamp may be a passive clamp that engages opposing edges of the countertop (i.e., inside the recess in the countertop and the outward edge of the countertop) by the positioning of the clamp. For example, the clamp may have a first jaw that is a spaced distance from a second jaw, and the spaced distance engages both edges by the positioning of the clamp. In another option, the claim may be an active clamp, wherein the first and second jaws are coupled by a clamp rod having a handle secured to an end of the clamp rod, and wherein the clamp rod includes a section of external screw threads for moving the first and second jaws together in response to the handle being turned to rotate the clamp rod in a first rotational direction and for moving the first and second jaws apart in response to the handle being turned to rotate the clamp rod in a second rotational direction. For the active clamp, the enlarged lower end of the stabilizer rod may be received within the first jaw and the clamp rod may be coupled between the first and second jaws to cause relative movement between the first and second jaws. Optional guide rails may also be included in the active clamp to prevent the second jaw from rotating with the rotation of the clamp rod. While the entire clamp may rotate relative to the stabilizer rod, the first and second jaws are preferably restricted to translational movement relative to each other. In one specific non-limiting example, the handle may have the shape of a knob suitable for manual turning by hand. In another specific non-limiting example, the handle may be a front-facing handle accessible below the front edge of the top cap.

In some embodiments, the apparatus may further include a guide track. One example of a guide track may extend laterally within the top cap in a position between the front edge and the first lateral axis. The area of the top cap that is between the front edge and the first lateral axis includes the portion of the top cap that may extend over the countertop. While the guide track may be linear and may extend parallel to the first lateral axis and/or parallel to a front edge of the top cap, the guide track may also be curved and/or angled relative to one or both of the front edge and the first lateral axis. Furthermore, some embodiments may include a plurality of guide tracks, where each guide track enables the support and adjustment of one or more separate stabilizer. When there are multiple guide tracks, the length and path of each guide track may limit the movement of a stabilizer. For example, it may be desirable in some embodiments to prevent the stabilizers from being positioned where they could interfere with placing the apparatus in a folded configuration and/or to prevent the stabilizers from being positioned so close together as to negate the stability advantage of having multiple stabilizers. The guide track allows a stabilizer to be adjusted or moved along the path of the guide track as desired to facilitate secure engagement of the stabilizer with a specific countertop and/or recess configuration. In one option, the guide track retains a slidable block within a central area of the top cap so that the stabilizer is positioned laterally inward of the first and second front legs, wherein the stabilizer will extend between the first and second front legs with the set of front legs and the set of back legs in a folded configuration relative to the top cap.

Some embodiments of the guide track may include a slidable block received with the guide track, wherein the slidable block has a complementary or matching profile to the guide track so as to avoid motion other than sliding along the path of the guide track. For example, the slidable block may have a cross-sectional profile that has a shape similar to a T-shape, a Y-shape, an X-shape, an I-shape, or other shape that will be slidably retained within the guide track. Furthermore, the guide track includes an upward-directed open slot and a downward-directed open slot. The upward-directed open slot may expose a first threaded hole in the slidable block, wherein a set screw may be inserted and threaded into the first threaded hole in the slidable block to push or pull the slidable block firmly against a surface of the guide track so that sliding is resisted. For example, a guide track cover plate may be fixed in position over the slidable block and have an upward-directed open slot that is wide enough for passage of a threaded shaft of the set screw, but narrow enough to prevent passage of a head of the set screw. The downward-directed open slot has a width that enables passage of the rod or shaft of the stabilizer therethrough. Accordingly, the threaded end of the stabilizer rod may be inserted through the downward-directed open slot and into a second threaded hole in the bottom of the slidable block. The threaded end of the stabilizer is threaded into the second threaded hole to secure the stabilizer to the slidable block without affecting the sliding of the block within the guide track. As a result, the slidable block may be selectively slidable within the guide track to adjust a position of the stabilizer. The set screw and/or an end of the stabilizer rod may each include a screw head or torque head, which may receive the end of a tool, such as a screwdriver or L-shaped wrench, to enabling turning of the set screw and/or the stabilizer rod. Preferably, the screw head or torque head of the set screw and stabilizer rod are accessible via the upward-directed open slot.

Some embodiments provide an apparatus comprising a set of front legs, a set of back legs, and a top cap that is pivotally coupled to the set of front legs along a first lateral axis and pivotally coupled to the set of back legs along a second lateral axis. The set of front legs includes a first front leg, a second front leg and at least one brace connected between the first and second front legs. The set of back legs includes a first back leg, a second back leg and at least one brace connected between the first and second back legs. The top cap has a front edge, a back edge, two side edges extending from the front edge to the back edge, and a top surface available for use as a seat. The first lateral axis is closer to the front edge than the second lateral axis, and the first lateral axis is spaced further from the front edge than the second lateral axis is spaced from the back edge. The apparatus further comprises a first stabilizer adjustably secured to the top cap between the front edge and the first lateral axis, wherein the first stabilizer is extendable in a downward direction from the top cap for engaging a recess within a countertop, and a second stabilizer adjustably secured to the top cap between the front edge and the first lateral axis, wherein the second stabilizer is extendable in a downward direction from the top cap for engaging the recess within the countertop. In one option, the apparatus may further comprise a first guide track within the top cap in a position between the front edge and the first lateral axis, wherein the first stabilizer may be secured to a first block that is slidable within the first guide track for adjusting a position of the first stabilizer, and a second guide track within the top cap in a position between the front edge and the first lateral axis, wherein the second stabilizer may be secured to a second block that is slidable within the second guide track for adjusting a position of the second stabilizer. In a further option, the first and second guide tracks may be laterally spaced apart, wherein the first guide track retains the first block in a first range of positions laterally inward of the first and second front legs, wherein the second guide track retains the second block in a second range of positions laterally inward of the first and second front legs, and wherein the first and second stabilizers may extend between the first and second front legs with the set of front legs and the set of back legs in a folded configuration relative to the top cap. In a still further option, the first block may be secured in a first lateral position within the first guide track using a first set screw, and wherein the second block may be secured in a second lateral position within the second guide track using a second set screw.

Some embodiments may include any combinations of features of the disclosed embodiments. Specific embodiments are non-limiting examples that illustrate features of the embodiments, but are not intended to limit the features that may be included or combined with any particular embodiment.

FIG. 1 is a perspective view of an over-the-counter seat (the "apparatus") 10 in an operative configuration and positioned in front of a mirror 2 and a cabinet 4 having a countertop 6 and sink 8. The apparatus 10 includes a set of front legs 20, a set of back legs 30 and a top cap 40. The top cap 40 is pivotally coupled to the set of front legs 20 along a first lateral axis 21 and pivotally coupled to the set of back legs 30 along a second lateral axis 31. The set of front legs 20 includes a first front leg 22, a second front leg 24 and at least one front brace 26 connected between the first and second front legs. The set of back legs 30 includes a first back leg 32, a second back leg 34 and at least one back brace 36 connected between the first and second back legs. As shown, the apparatus 10 includes two back braces 36 in the form of steps having an upward-facing step surface. An optional spreader 12 is pivotally connected between the first front leg 22 and the first back leg 32 to maintain a desired distance between the legs 22, 32 and prevent the legs 22, 32 from spreading apart or folding together when the apparatus 10 is in use in the operative configuration. Since the set of front legs 20 are coupled together by the front brace 26 and the set of back legs 30 are coupled together by the back braces 36, the spreader 12 keeps all of the legs in the proper location for the operative configuration.

Figure 2B:
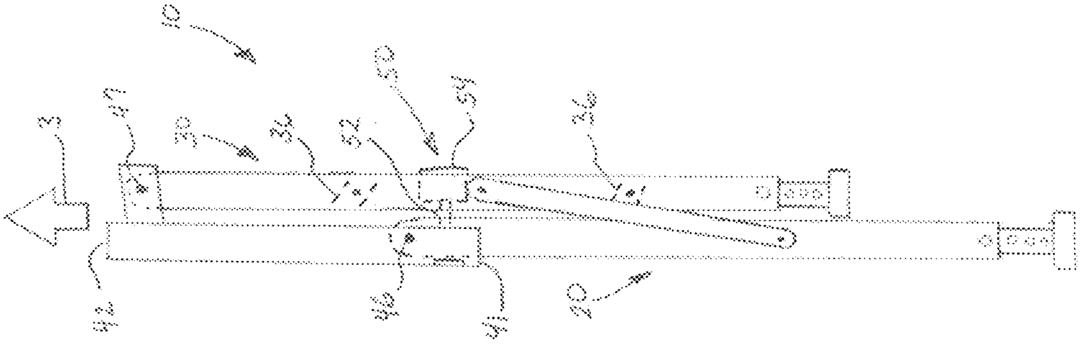
FIGS. 2A-B are side views of the apparatus in an operative configuration and a folded configuration, respectively.

The top cap 40 may include a first front hinge pin 46 that couples the first front leg 22 to the top cap 40 and defines the first lateral axis 21 about which the first front leg 22 may pivot when placing the apparatus into a folded configuration (see FIG. 2B). The second front leg 24 may be similarly coupled to the top cap 40 with a second front hinge pin. The top cap 40 may also include first and second back hinge pins 47 that couple the first and second back legs 32, 34 to the top cap 40 along a second lateral axis 31.

The top cap 40 has a front edge 41, a back edge 42, two side edges 43, 44 extending from the front edge 41 to the back edge 42, and a top surface 45 available for use as a seat. The first lateral axis 21 is closer to the front edge 41 than the second lateral axis 31, and the first lateral axis 21 is spaced further from the front edge 41 than the second lateral axis 31 is spaced from the back edge 42.

The apparatus 10 further includes a stabilizer 50 (not shown; see FIGS. 3 to 7B) secured to the top cap 40 between the front edge 41 and the first lateral axis 21, wherein the stabilizer extends in a downward direction from the top cap 40 for engaging the countertop 6. A lateral position of the stabilizer 50 (not shown) may be adjusted along a guide track 60 formed in, or secured to, the top cap 40. As shown, the guide track 60 is able to support the use of two stabilizers 50 (not shown) and has two upward-directed slots 72 for adjusting the two stabilizers 50.

Figure 2A:
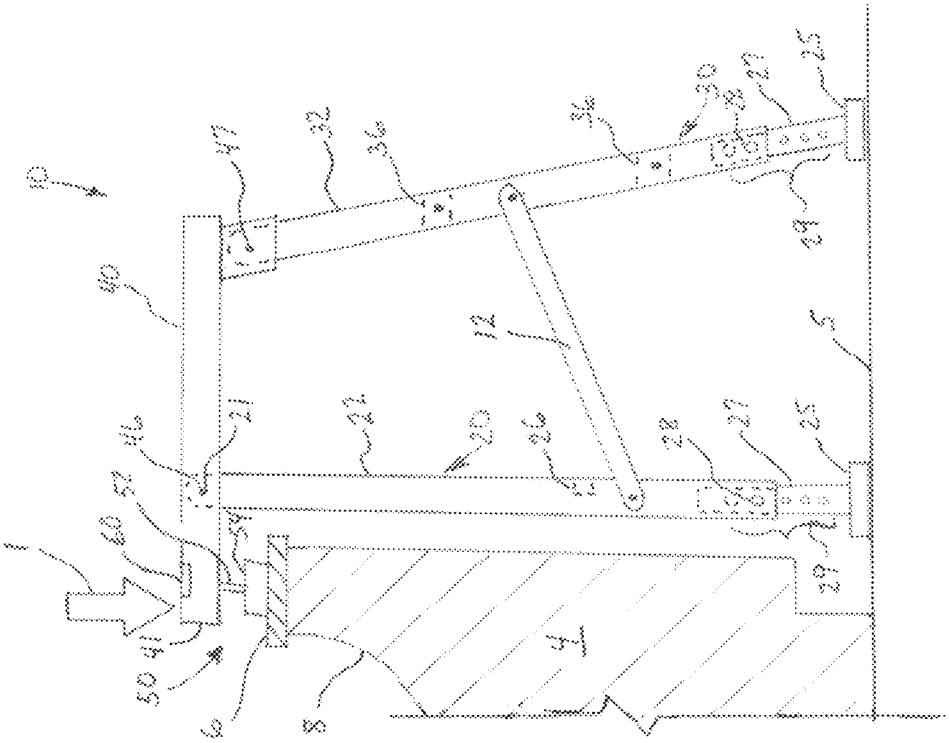

FIGS. 2A-B are side views of the apparatus 10 in an operative configuration (FIG. 2A) and a folded configuration (FIG. 2B), respectively. In FIG. 2A, the apparatus 10 is in the operative configuration and positioned immediately in front of the cabinet 4 that supports the countertop 6 and a sink (recess) 8. FIG. 2A is consistent with FIG. 1, but further illustrates a stabilizer 50. Specifically, the apparatus 10 is shown with the set of front legs 20 (first front leg 22 is shown) in an upright position supporting a middle portion of the top cap 40 via the front hinge pins 46 and with the set of back legs 30 (first back leg 32 is shown) in an upright position supporting a back portion of the top cap 40 via the back hinge pins 47. Furthermore, the spreader 12 is extended between the first front leg 22 and the first back leg 32 to maintain a desired distance between the legs 22, 32 for the operative configuration.

In FIG. 2A, the legs 22, 32 (as well as the legs 24, 34; not shown) are adjustable height legs. In this embodiment, the adjustable height legs 22, 32 are made with telescoping tubes or rails, such that the lower extension tube or rail 27 extends up into the upper tube or rail and forms a foot 25 for engaging the floor 5. A hole 28 through the upper tube or rail may be aligned with one of a series of holes 29 in the lower extension tube or rail 27 and a pin or button may be positioned through the hole 28 and the selected one of the holes 29 to set the height of the leg at a desired height. A pin or button extendable into the holes 28, 29 is preferably an spring-loaded button that may be manually pushed or pulled out of the hole 28 and/or hole 29 to enable an incremental adjustment of the leg height.

The stabilizer 50 includes a stabilizer rod 52 and a stabilizer pad 54. The stabilizer rod 52 has an upper end that is coupled to the top cap 40 as described further below. A lower end of the rod 52 is coupled to the stabilizer pad 54 as described further below. The stabilizer 50 extends from the bottom of the top cap 40 so that the stabilizer pad 54 engages the countertop 6. Accordingly, the stabilizer 50 may oppose a downward force (illustrated by arrow 1) applied near the front edge 41 of the top cap 40, which force may be the weight of a person sitting on the top cap 40. Although the legs 20, 30 should be strong enough to support all the weight of a person, if the person's center of mass is shifted forward of the first lateral axis 46 where the front legs 20 are connected to the top cap 40 by the front hinge pins 46, the apparatus 10 could tip down and forward in the absence of the stabilizer 50. Optional and additional features of the stabilizer are illustrated and discussed below.

In FIG. 2B, the apparatus 10 is in the folded configuration. The folded configuration takes up less space for storage or carrying of the apparatus 10. With no weight on the top cap 40, lifting the back edge 42 of the top cap 40 (illustrated by arrow 3) allows the front edge 41 of the top cap 40 to pivot downward, the set of front legs 20 to remain vertical by pivoting about the front hinge pins 46, the set of back legs 30 to pivot forward about the back hinge pins 47, and the spreader 12 to pivot relative to the front and back legs 20, 30. A beneficial feature of the apparatus 10 is that the stabilizer 50 is laterally positioned to be received between the front legs and between the back legs. Furthermore, the stabilizer 50 is received between the two back braces or steps 36.

Figure 3:
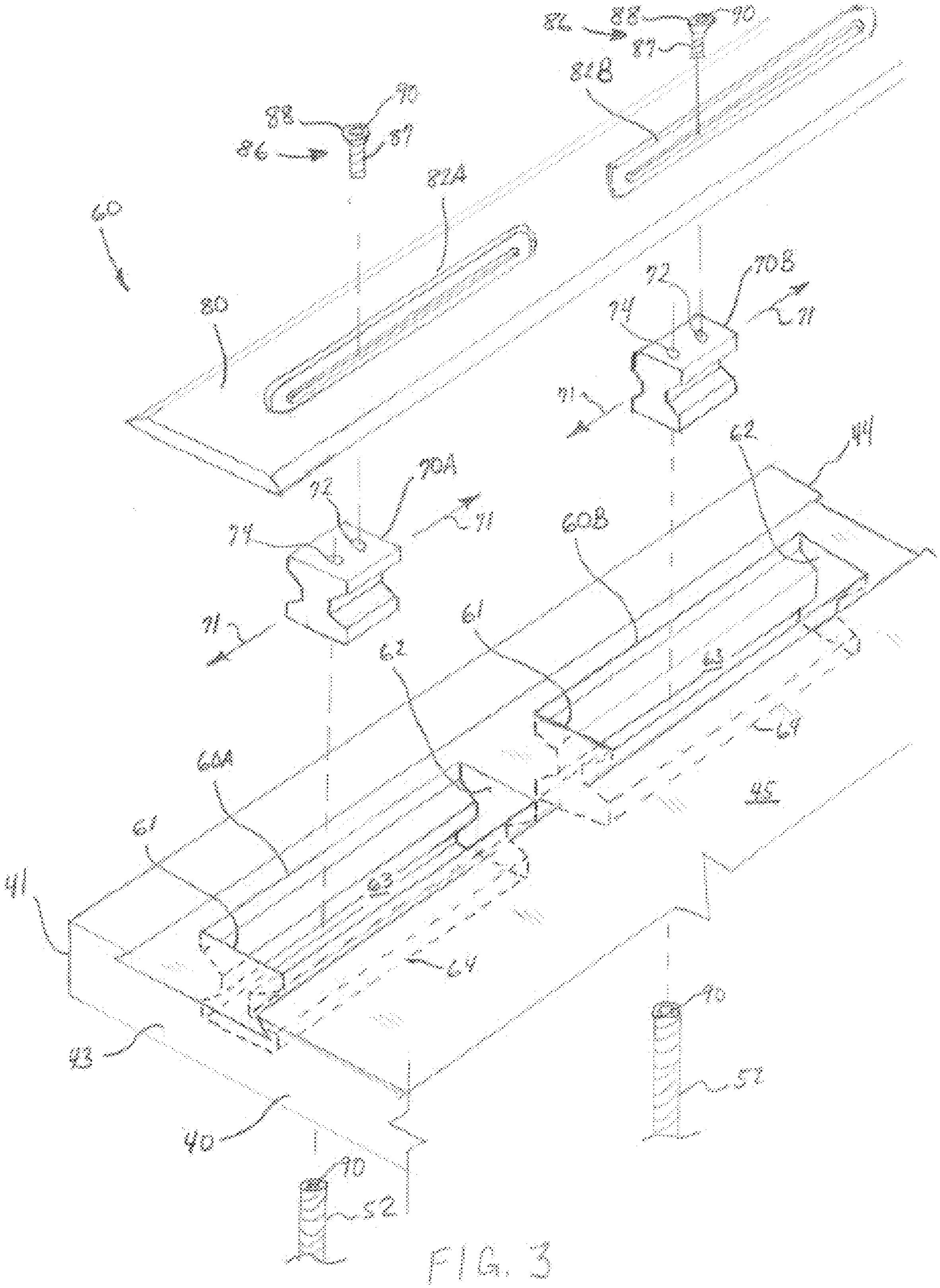
FIG. 3 is a perspective view of a guide track and securable slide that are included near a front edge of a seat.

FIG. 3 is an exploded perspective view of the guide track 60 and one or more slidable blocks 70A, 70B that are included near the front edge 41 of a seat 40. The guide track 60 extends laterally within the top cap 40 in a position between the front edge 41 and the first lateral axis 21 (see FIG. 2A). The front area of the top cap 40 that is between the front edge 41 and the first lateral axis includes the portion of the top cap that may extend over the countertop 6 (see FIG. 2A). The guide track 60 is linear and extends parallel to the front edge 41, although the guide track could alternatively be curved and/or angled relative to one or both of the front edge and the first lateral axis.

Furthermore, the guide track 60 may be considered to be divided into first and second guide tracks 60A, 60B, where each guide track 60A, 60B enables the support and adjustment of one or more separate stabilizer and limits the range and path of movement of a stabilizer (not shown). For example, each guide track 60A, 60B has a first end 61 and a second end 62, and has a channel 63 extending between the first and second ends 61, 62. The channel 63 has a profile that is complementary to the profile of the slidable blocks 70A, 70B and the slidable blocks 70A, 70B may be seated within the channel 63. Accordingly, the slidable blocks 70A, 70B may slide (translational movement) along the lateral path of the respective channels 63 (illustrated by arrows 71). Furthermore, the channel 63 opens to a downward-directed open slot 64 is also has an open top.

However, the first end 61 of the channel 63 in the first guide track 60A prevents the first slidable block 70A from being positioned all the way to the first side 43 of the top cap 40 where it could interfere with folding of the first front and back legs 22, 32 and the second end 62 of the channel 63 in the second guide track 60B prevents the second slidable block 70B from being positioned all the way to the second side 44 of the top cap 40 where it could interfere with folding of the second front and back legs 24, 34 (see FIG. 1). Furthermore, the second end 62 of the channel 63 in the first guide track 60A prevents the first slidable block 70A from being positioned all the way to the middle of the top cap 40, and the first end 61 of the channel 63 in the second guide track 60B prevents the second slidable block 70B from being positioned all the way to the middle of the top cap 40. The benefit of preventing the blocks 70A, 70B from being position too close to the middle of the top cap 40 is that the stabilizers 50 (not shown) connected to the first and second slidable blocks 70A, 70B would be too close together to provide an intended amount of stability to the top cap 40 under the shifting weight of a person sitting on the top cap 40. The guide track allows a stabilizer to be adjusted or moved along the path of the guide track as desired to facilitate secure engagement of the stabilizer with a specific countertop and/or recess configuration.

The slidable block 70 may held within the channel 63 by a guide track cover plate 80 that is fixed in position over the first and second guide tracks 60A, 60B and the slidable blocks 70A, 70B, and/or by the shape of the slidable block itself. For example, an I-shaped slidable block as shown in FIG. 3 will not lift out of the guide track or drop out of the guide track even in the absence of a guide track cover plate. The cover plate 80 has upward-directed open slots 82A, 82B that are wide enough for passage of a threaded shaft 87 of the set screw 86, but narrow enough to prevent passage of a head 88 of the set screw 86. The upward-directed open slots may also expose a first threaded hole 72 in each of the slidable blocks 70A, 70B so that one of the set screws 86 may be inserted and threaded into the first threaded hole 72 in each of the slidable blocks to push or pull the slidable block 70 firmly against a surface of the channel 63 or cover plate 80 so that the blocks resist sliding.

The downward-directed open slots 64 have a width that enables passage of the rod or shaft 52 of the stabilizer (not shown) therethrough. Accordingly, the threaded end of the stabilizer rod 52 may be inserted through the downward-directed open slot 64 and into a second threaded hole 74 in the bottom of each of the slidable blocks 70A, 70B. The threaded end 52 of each stabilizer rod is threaded into the second threaded hole 74 to secure the stabilizer to the slidable block 70A, 70B without affecting the sliding of the block within the guide track. Each of the slidable blocks 70A, 70B may be selectively slidable within their respective guide tracks 60A, 60B to adjust a position of the corresponding stabilizer. The set screw 86 and/or an end of the stabilizer rod 52 may each include a screw head or torque head 90, which may receive the end of a tool (not shown), such as a screwdriver or L-shaped wrench, to enabling turning of the set screw 86 and/or the stabilizer rod 52. Preferably, the screw heads or torque heads of the stabilizer rods 52 are accessible via the upward-directed open slots 82A, 82B and through the upper end of the second threaded holes 74.

Figure 4A:
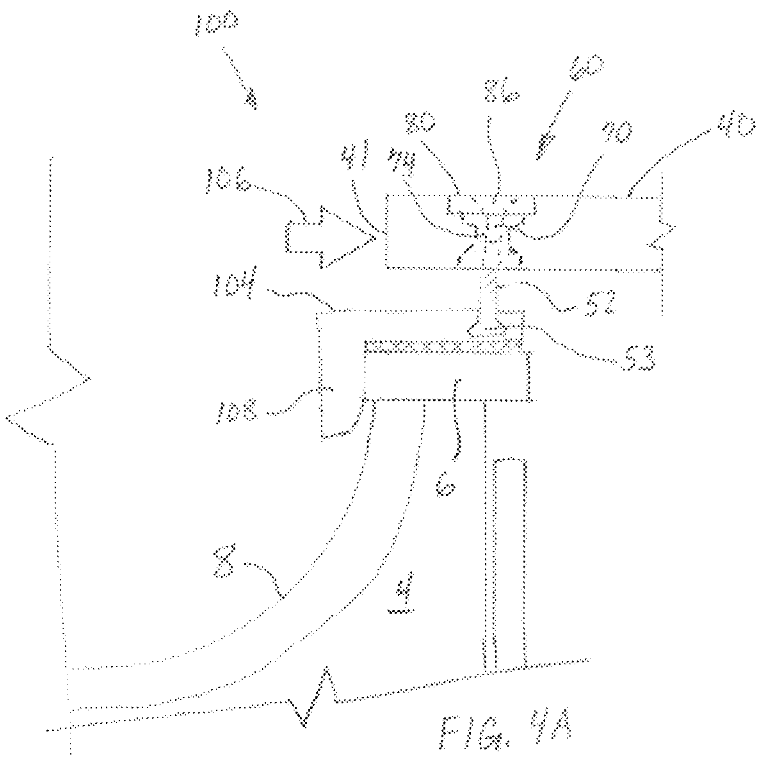
FIG. 4A is a side view of an adjustable stabilizer extending from the front edge of the seat to engage a recess formed by the countertop and/or the sink.

FIG. 4A is a side view of an adjustable stabilizer 100 extending from a guide track 60 in the top cap 40 to engage the countertop 6 and a recess 8 formed in the countertop and/or a sink. The set screw 86 secures the slidable block 70 in a desired position within the guide track 60 by pulling the slidable block 70 against the cover plate 80. The stabilizer rod 52 has a first end (having the head 90) that is threadably coupled into the second threaded hole 74 in slidable block 70 and a second end 53 that is secured within the stabilizer pad 104. However, the second end 53 of the stabilizer rod 52 is preferably able to rotate within the stabilizer pad 104, so that the stabilizer rod may be rotated to adjust extension of the stabilizer pad without causing the stabilizer pad to rotate.

The primary difference in the stabilizer pad 104 and the stabilizer pad 54 of FIG. 2A is that the stabilizer pad 104 has an arm or jaw 108 that extends into the recess 8 in the countertop 6 as well as engaging the top surface of the countertop 6. As a result of the stabilizer pad 104 extending into the recess 8, and preferably abutting the inner surface of the recess 8 (which includes the inside edge of the countertop itself), the apparatus 10 is prevented from being pushed back (see arrow 106) away from the cabinet 4 as the person shifts their weight while sitting on the top cap 40.

Figure 4B:
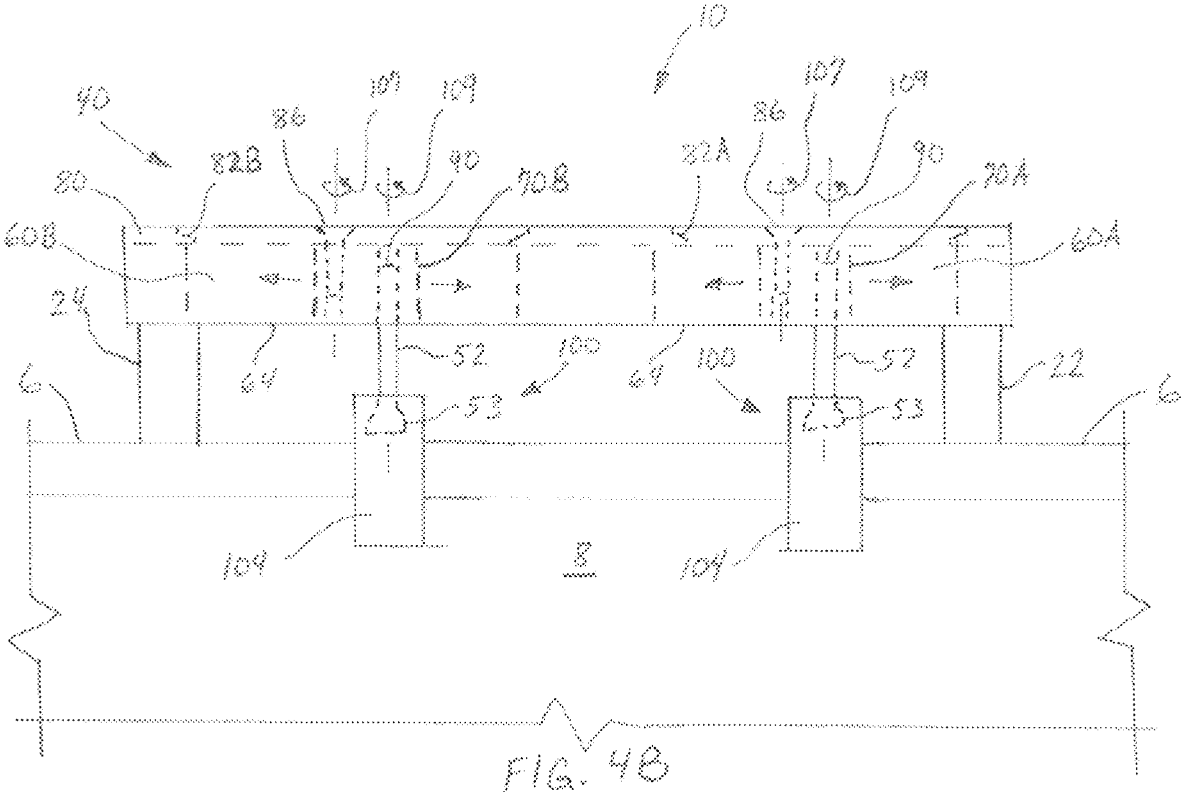
FIG. 4B is a front view of the seat having two adjustable stabilizers extending from the front edge of the seat to engage a recess formed by the countertop and/or the sink.

FIG. 4B is a front view of the apparatus 10 having two adjustable stabilizers 100 extending from the top cap 40 and engaging the recess 8 formed by in the countertop 6. Each stabilizer 100 includes a stabilizer pad 104 coupled to the stabilizer rod 52, wherein the stabilizer rod 52 extends through the downward-directed slot 64 and is threadably secured to a respective one of the slidable blocks 70A, 70B. Each slidable block 70A, 70B may slide laterally (left and right in the view of FIG. 4B) within a respective guide track 60A, 60B.

Before sitting on the top cap 40, an individual should fold out the apparatus 10 in the operative configuration and make sure the height positions the forward edge of the top cap 40 over the countertop 6 (see FIG. 2A), then slide the slidable blocks 70A, 70B to desired lateral positions (preferably separated as much as possible) and tighten the set screws 86 (see rotational arrow 107). Then, the stabilizers 100 may be vertically adjusted by turning the stabilizer rods 52 (see rotational arrows 109B) to engage the stabilizer pads 104 against the countertop 6 with the arms or jaws 108 extending into the recess 8.

Figure 5:
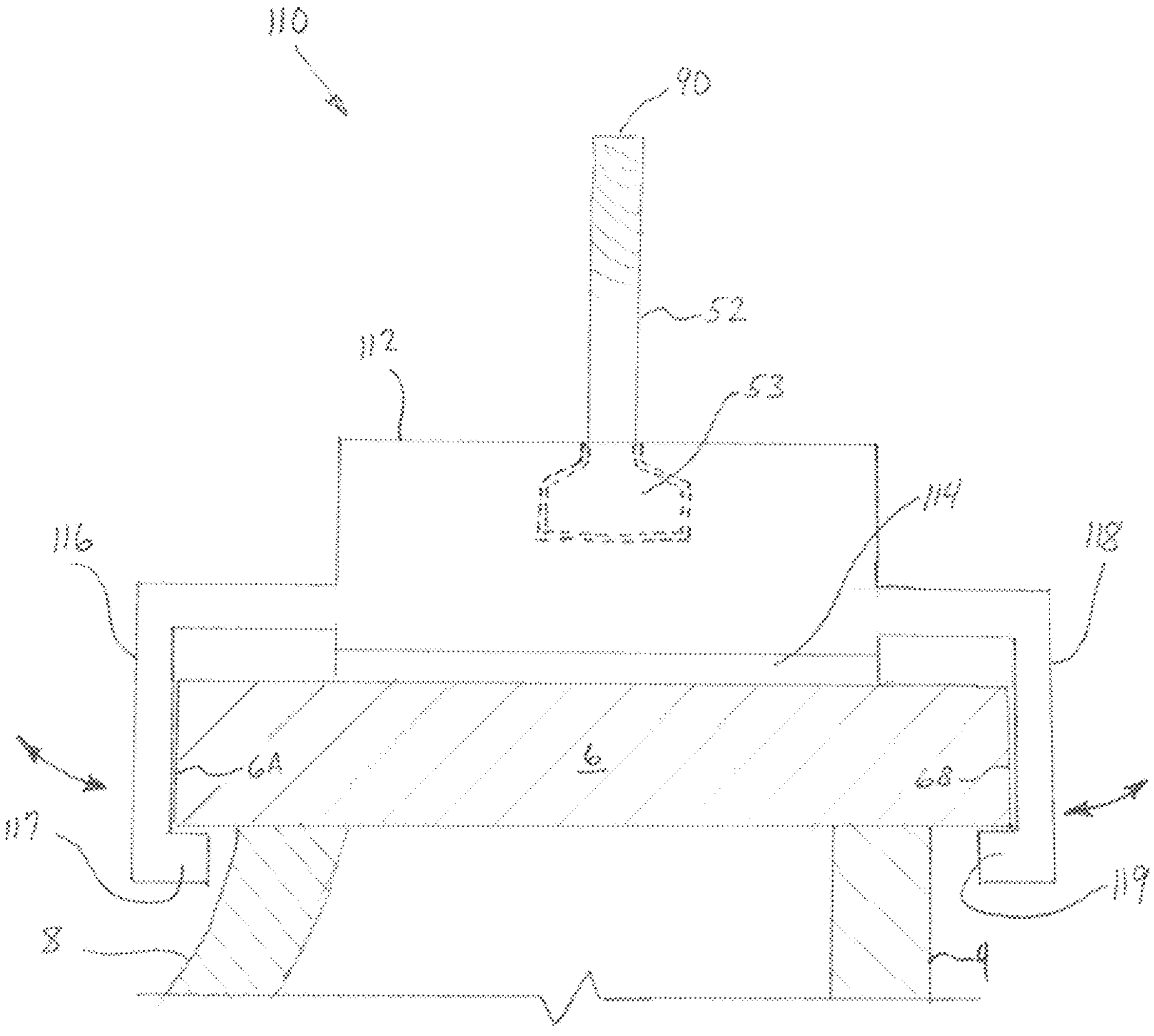
FIG. 5 is a cross-sectional side view of an adjustable stabilizer engaging the opposing edges of the countertop.

FIG. 5 is a side view of an adjustable stabilizer 110 engaging the opposing edges 6A, 6B of the countertop 6. The adjustable stabilizer 110 includes the stabilizer rod 52 with a first end (having the head 90) that is threaded for coupling into a second threaded hole in a slidable block 70 (see FIG. 3) and a second end 53 that is enlarged and secured within a stabilizer pad 112. The stabilizer pad 112 may have a gripping element or coating 114 for engaging a top surface of the countertop 6. The stabilizer pad 112 may also have a first (inner) arm 116 for engaging an inner edge 6A of the countertop 6 (or a surface of the recess 8) and a second (outer) arm 118 for engaging an outer edge 6B of the countertop 6. Optionally, the first and second arms 116, 118 may be manually flexed outward to open up (i.e., the first arm 116 flexed to the left and the second arm 118 flexed to the right) and, after the stabilizer pad 112 has engaged the top surface of the countertop 6, may be released so that the arms 116, 118 relax and retract inward to close against the opposing edges 6A, 6B. The arms 116, 118 are shown with optional hooks 117, 119 that extend under a lip formed under each of the opposing edges 6A, 6B, respectively.

Figure 6:
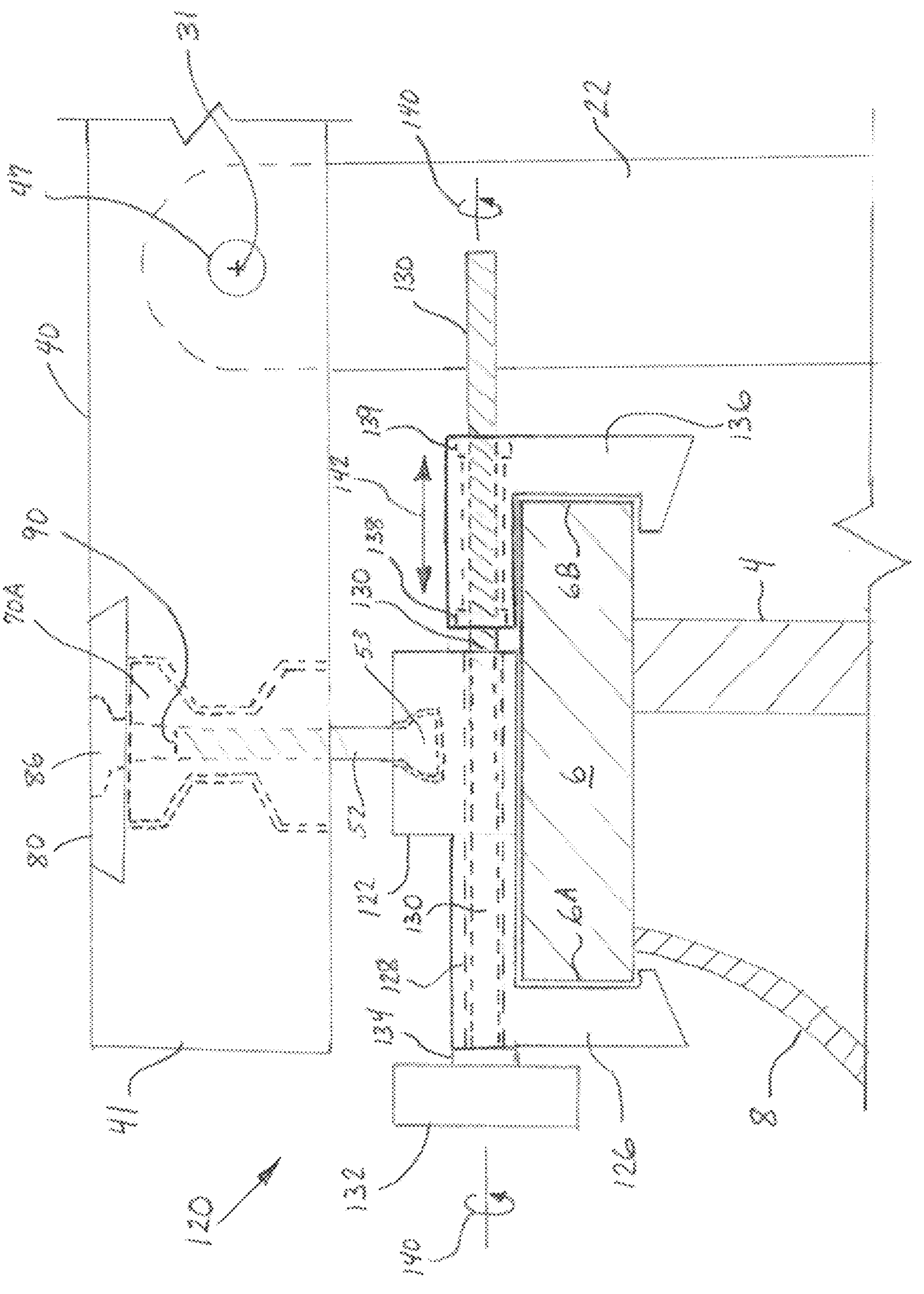
FIG. 6 is a cross-sectional side view of an adjustable stabilizer forming a clamp that can be tightened against opposing edges of the countertop.

FIG. 6 is a cross-sectional side view of an adjustable stabilizer 120 forming a clamp that can be tightened against opposing edges 6A, 6B of the countertop 6. As in other embodiments, the stabilizer 120 includes a stabilizer rod 52 with a first end (having the head 90) that is threaded for coupling into a second threaded hole in the slidable block 70A (see FIG. 3) and a second end 53 that is enlarged and secured within the stabilizer pad 122. The stabilizer pad 112 engages a top surface of the countertop 6 and forms a first arm or jaw 126 for engaging an inner edge 6A of the countertop 6 (and/or a surface of the recess 8). The stabilizer pad 122 and jaw 126 include a cylindrical hole 128 that extends therethrough. A clamp rod 130 extends through the cylindrical hole 128 and is secured to a knob 132 with a bearing surface 134 at one end. The other end of the clamp rod 130 is threaded for threaded engagement with a second arm or jaw 136. For example, the second jaw 136 may include a first threaded nut 138 where the threaded portion of the clamp rod 130 enters the second jaw 136 and a second threaded nut 139 where the threaded portion of the clamp rod 130 exits the second jaw 136. Accordingly, rotating the knob 132 (see rotational arrows 140) causes rotation of the clamp rod 130 and, due the threaded engagement of the threaded portion of the clamp rod 130 with the first and second threaded nuts 138, 139, the rotation of the clamp rod 130 causes the second jaw 136 to travel along the length of the threaded portion of the clamp rod 130. Rotation of the knob 132 in a first rotational direction causes the second jaw 136 to move away from the stabilizer pad 122 and thereby open the jaws 126, 136 of the clamp, whereas rotation of the knob 132 in a second rotational direction causes the second jaw 136 to move toward the stabilizer pad 122 and thereby close the jaws 126, 136 of the clamp against the opposing edges 6A, 6B of the countertop 6 (see movement arrow 142).

Figure 7A:
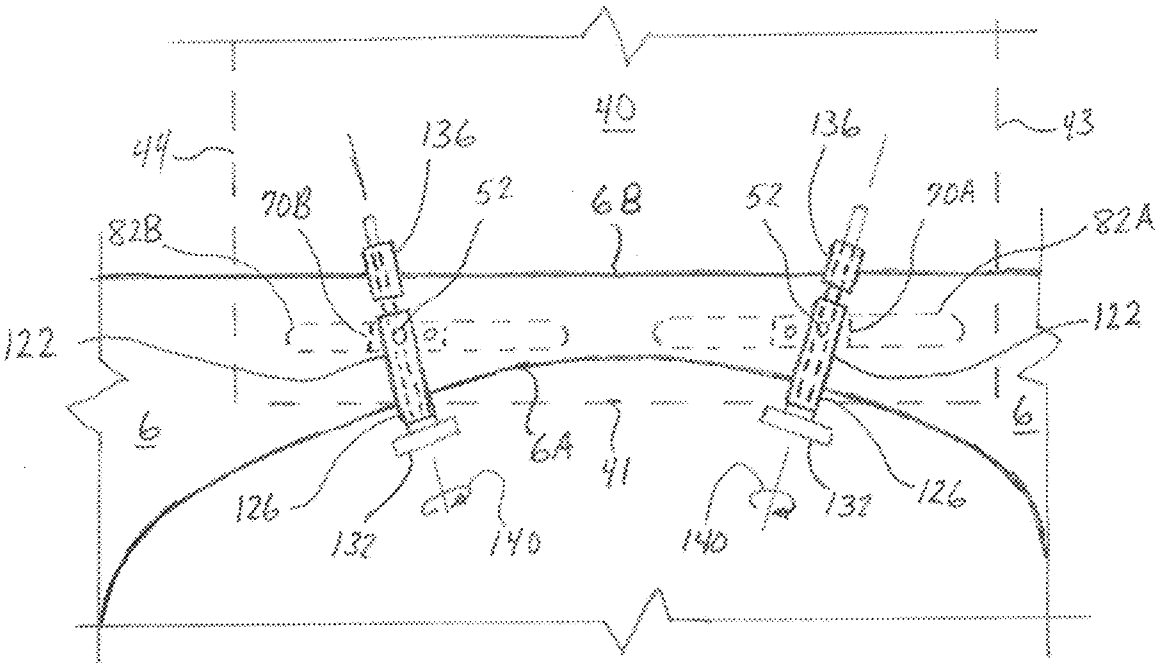
FIG. 7A is a schematic top view of the adjustable stabilizer that has pivoted to accommodate the contour of the inside and/or outside edge of a first countertop or sink.

FIG. 7A is a schematic top view of a portion of apparatus 10 including two adjustable stabilizers 120 that have pivoted about the axis of the respective stabilizer rods 52 to accommodate the contour of the inside edge 6A and/or outside edge 6B of a first countertop or sink 6. Accordingly, one of the adjustable stabilizers 120 has pivoted clockwise and the other of the adjustable stabilizers 120 has pivoted counter-clockwise.

Figure 7B:
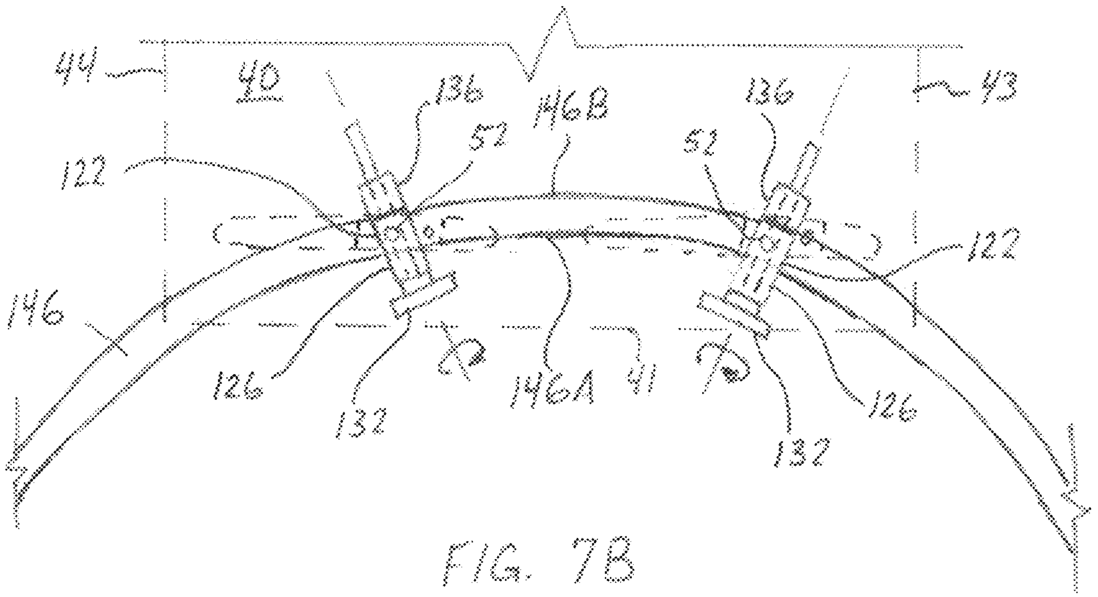
FIG. 7B is a schematic top view of the adjustable stabilizer that has pivoted to accommodate the contour of the inside and/or outside edge of a second countertop or sink.

FIG. 7B is a schematic top view of a portion of the apparatus 10 including two adjustable stabilizers 120 that have pivoted to accommodate the contour of the inside edge 146A and/or outside edge 146B of a second countertop or sink 146. For example, the second countertop of sink 146 may be a pedestal sink. As a result of the narrow edge of the pedestal sink 146 and/or a different shape of the pedestal sink or other type sink, the adjustable stabilizers 120 may pivoted clockwise and/or counter-clockwise about the stabilizer rods 52 to a greater or lesser extent than in FIG. 7A. Also note that the jaws 126, 136 are closed further in FIG. 7B than in FIG. 7A. It should also be appreciated that the slidable blocks 70A, 70B may also be repositioned along the guide tracks between FIG. 7A and FIG. 7B as desired for stability of the top cap 40 in view of a person sitting on the top cap 40.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a set of front legs including a first front leg, a second front leg and at least one brace connected between the first and second front legs;

a set of back legs including a first back leg, a second back leg and at least one brace connected between the first and second back legs;

a top cap having a front edge, a back edge, two side edges extending from the front edge to the back edge, and a top surface available for use as a seat, wherein the top cap is pivotally coupled to the set of front legs along a first lateral axis and pivotally coupled to the set of back legs along a second lateral axis, wherein the first lateral axis is spaced closer to the front edge than the second lateral axis is spaced from the front edge, and wherein the first lateral axis is spaced further from the front edge than the second lateral axis is spaced from the back edge;

a stabilizer secured to the top cap between the front edge and the first lateral axis, wherein the stabilizer extends in a downward direction from the top cap for engaging a countertop; and a guide track extending laterally within the top cap in a position between the front edge and the first lateral axis, wherein the stabilizer is secured to a block that is slidable within the guide track for adjusting a lateral position of the stabilizer.

2. The apparatus of claim 1, wherein the stabilizer is adjustably extendable in the downward direction from the top cap.

3. The apparatus of claim 2, wherein the stabilizer is adjustably extendable in the downward direction from the top cap for engaging a recess within the countertop.

4. The apparatus of claim 3, wherein the recess within the countertop is a sink.

5. The apparatus of claim 3, wherein the stabilizer forms a clamp having a first jaw that is received inside the recess and a second jaw that is received along an outward edge of the countertop.

6. The apparatus of claim 5, wherein the first and second jaws are coupled by a rod having a handle secured to an end of the rod, wherein the rod includes a section of external screw threads for moving the first and second jaws together in response to the handle being turned to rotate the rod in a first rotational direction and for moving the first and second jaws apart in response to the handle being turned to rotate the rod in a second rotational direction.

7. The apparatus of claim 6, wherein the handle is in the shape of a knob.

8. The apparatus of claim 7, wherein the handle is front-facing handle accessible below the front edge of the top cap.

9. The apparatus of claim 1, wherein the set of front legs and the set of back legs elevate the top cap to a height greater than a height of the countertop.

10. The apparatus of claim 1, wherein each of the legs is an adjustable height leg.

11. The apparatus of claim 1, wherein the at least one brace connected between the first and second back legs forms at least one step.

12. The apparatus of claim 1, further comprising:

a spreader having a first end pivotably coupled to the first front leg and a second end pivotably coupled to the first back leg.

13. The apparatus of claim 1, wherein the block is secured in the lateral position within the guide track using a set screw.

14. The apparatus of claim 1, wherein the guide track retains the block within a central area of the top cap so that the stabilizer is positioned laterally inward of the first and second front legs, and wherein the stabilizer will extend between the first and second front legs with the set of front legs and the set of back legs in a folded configuration relative to the top cap.

15. An apparatus, comprising:

a set of front legs including a first front leg, a second front leg and at least one brace connected between the first and second front legs;

a set of back legs including a first back leg, a second back leg and at least one brace connected between the first and second back legs;

a top cap having a front edge, a back edge, two side edges extending from the front edge to the back edge, and a top surface available for use as a seat, wherein the top cap is pivotally coupled to the set of front legs along a first lateral axis and pivotally coupled to the set of back legs along a second lateral axis, wherein the first lateral axis is spaced closer to the front edge than the second lateral axis is spaced from the front edge, and wherein the first lateral axis is spaced further from the front edge than the second lateral axis is spaced from the back edge;

a stabilizer secured to the top cap between the front edge and the first lateral axis, wherein the stabilizer extends in a downward direction from the top cap for engaging a countertop, and wherein the stabilizer is free to pivot about a downward-directed axis with the set of front legs and the set of back legs in an operative configuration relative to the top cap.

16. The apparatus of claim 15, further comprising:

a guide track extending laterally within the top cap in a position between the front edge and the first lateral axis, wherein the stabilizer is secured to a block that is slidable within the guide track for adjusting a lateral position of the stabilizer.

17. The apparatus of claim 15, wherein the stabilizer forms a clamp having a first jaw that is received inside the recess and a second jaw that is received along an outward edge of the countertop.

18. An apparatus, comprising:

a set of front legs including a first front leg, a second front leg and at least one brace connected between the first and second front legs;

a set of back legs including a first back leg, a second back leg and at least one brace connected between the first and second back legs;

a top cap having a front edge, a back edge, two side edges extending from the front edge to the back edge, and a top surface available for use as a seat, wherein the top cap is pivotally coupled to the set of front legs along a first lateral axis and pivotally coupled to the set of back legs along a second lateral axis, wherein the first lateral axis is spaced closer to the front edge than the second lateral axis is spaced from the front edge, and wherein the first lateral axis is spaced further from the front edge than the second lateral axis is spaced from the back edge;

a first stabilizer adjustably secured to the top cap between the front edge and the first lateral axis, wherein the first stabilizer is extendable in a downward direction from the top cap for engaging a recess within a countertop;

a second stabilizer adjustably secured to the top cap between the front edge and the first lateral axis, wherein the second stabilizer is extendable in a downward direction from the top cap for engaging the recess within the countertop;

a first guide track within the top cap in a position between the front edge and the first lateral axis, wherein the first stabilizer is secured to a first block that is slidable within the first guide track for adjusting a position of the first stabilizer; and a second guide track within the top cap in a position between the front edge and the first lateral axis, wherein the second stabilizer is secured to a second block that is slidable within the second guide track for adjusting a position of the second stabilizer.

19. The apparatus of claim 18, wherein the first and second guide tracks are laterally spaced apart, wherein the first guide track retains the first block in a first range of positions laterally inward of the first and second front legs, wherein the second guide track retains the second block in a second range of positions laterally inward of the first and second front legs, and wherein the first and second stabilizers will extend between the first and second front legs with the set of front legs and the set of back legs in a folded configuration relative to the top cap.

20. The apparatus of claim 19, wherein the first block is securable in a first lateral position within the first guide track using a first set screw, and wherein the second block is securable in a second lateral position within the second guide track using a second set screw.

* * * * *